Nov. 29, 1932.        M. E. ZIMMERER        1,889,584
INTERNAL COMBUSTION ENGINE HUMIDIFIER
Filed May 26, 1930
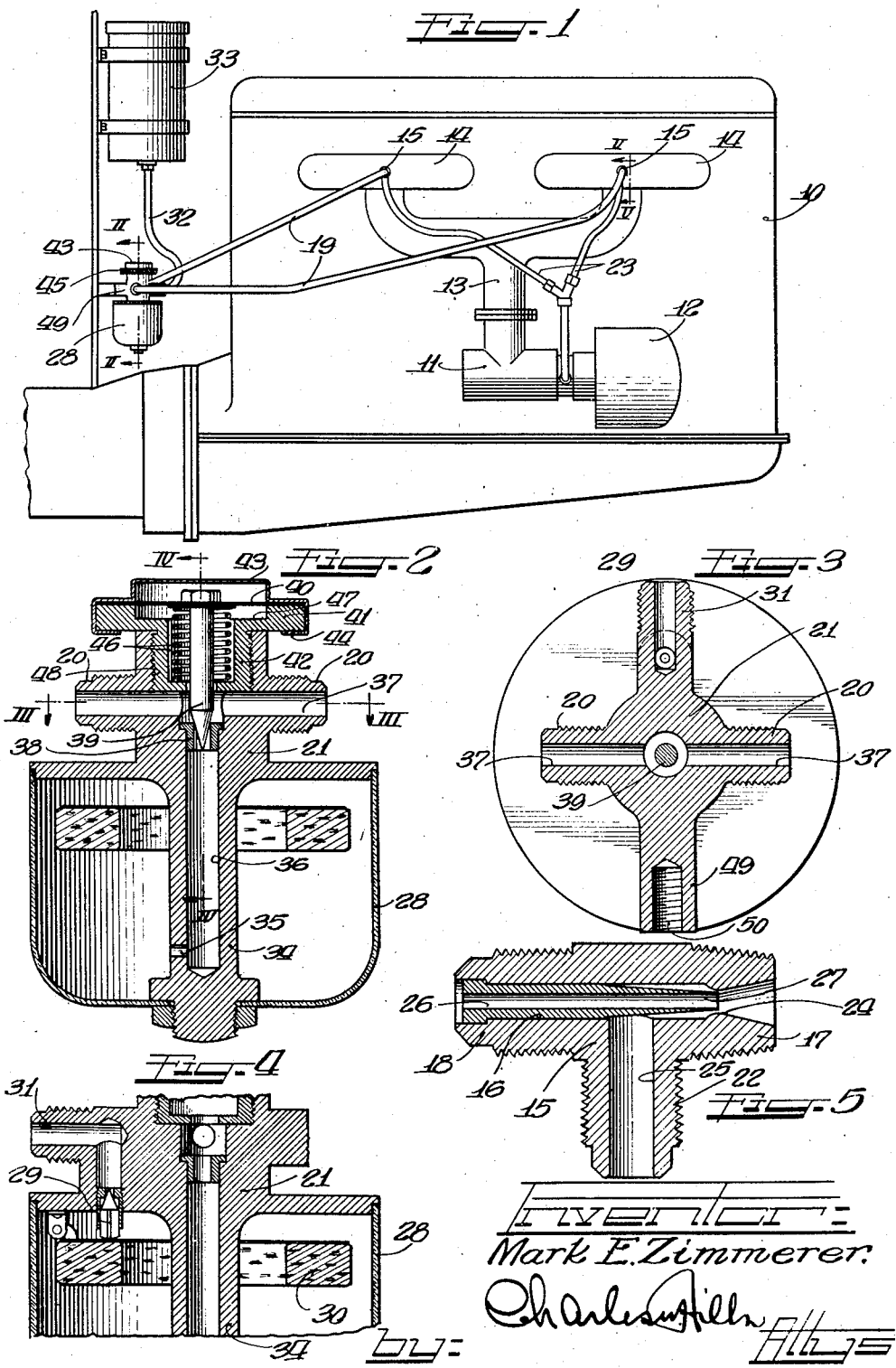
Inventor:
Mark E. Zimmerer.
by Charles Hill
Attys Patented Nov. 29, 1932

1,889,584

UNITED STATES PATENT OFFICE

MARK E. ZIMMERER, OF KOKOMO, INDIANA, ASSIGNOR TO KINGSTON PRODUCTS CORPORATION, OF KOKOMO, INDIANA, A CORPORATION OF INDIANA

INTERNAL COMBUSTION ENGINE HUMIDIFIER

Application filed May 26, 1930. Serial No. 455,590.

This invention relates to an engine humidifier for feeding small quantities of water into the intake systems of internal combustion engines.

It is an object of this invention to provide an improved system of water vapor or spray injection into the intake systems of internal combustion engines. The results in smoother operation and hence increased power factor permitted by the improved engine operating conditions resulting from water injection is well known and it is the purpose of this invention to provide improved injection and control apparatus wherein the intermittent supply of slugs of liquid water is avoided by mixing the water with air and injecting the mixture at high velocity to assure proper atomization of the water.

It is another object of this invention to provide control means governing the water injection that will automatically shut off the water supply under idling or part load conditions under which the injection of water is unnecessary and in fact detrimental to best performance, since it is only under full power operating conditions that the supply of a limited amount of water vapor, to the combustible charge reaching the engine cylinders, is of marked advantage.

It is a further object of this invention to provide an improved and simplified form of automatic engine humidifier for the purpose described wherein the water will be atomized and sprayed into the engine at high speed without the complication of mechanically operated pumps or injectors and without the possibility of a continued feed after the engine has stopped.

Other and further important objects of this invention will be apparent from the disclosures in the specification and the accompanying drawing.

This invention (in a preferred form) is illustrated in the drawing and hereinafter more fully described.

On the drawing:

Figure 1 is a side view of an engine and the intake system thereof to which has been applied a water feeding system embodying the features of this invention.

Figure 2 is an enlarged vertical section of the humidifier on the line II—II of Figure 1.

Figure 3 is a section on the line III—III of Figure 2 showing the water supply and outlet connections.

Figure 4 is a fragemntary detail section on the line IV—IV of Figure 2 illustrating the float valve.

Figure 5 is an enlarged section on the line V—V of Figure 1 showing the injector body structure.

As shown on the drawing:

The engine chosen to illustrate the application of one embodiment of this invention includes a cylinder block 10 and an intake or induction system comprising a carbureter 11 equipped with an air cleaner 12, the carbureter feeding a riser 13 and branch manifolds 14 attached to ports on the cylinder block. This invention is particularly adapted for use with heavy duty engines such as stationary tractor, and truck engines, which are usually equipped with an air cleaner.

Th particular engine chosen for illustration is provided with twin secondary or branch intake ducts or manifolds, and I have found it to be advantageous to use duplicate water injectors 15 in each branch to secure more uniform distribution under such circumstances. However, a single water injector will operate satisfactorily if positioned similar to the usual tapped connection provided for the operation of suction operated devices such as vacuum fuel feed systems and windshield wipers.

An enlarged section of the injector 15 is shown in Figure 5, the body resembling a T and having a horizontal passage 16, the right hand end 17 being threaded to engage in a tapped hole in the manifold and the opposite end 18 being threaded for a coupling for tubing 19 leading to outlets 20 on a humidifier body 21. The depending stem 22 of the injector body is also threaded for a coupling for tubing 23 which leads to the air cleaner 12, if one is used, in order to supply clean air to the manifold. The passage 16 is formed with a venturi like restriction 24 to the right of the air inlet passage 25 in the stem 22, and a nozzle 26 is inserted in the left side of the passage, the tapered tip 27 of the nozzle being centered in the throat of the venturi like restriction, so that air flowing therethrough has an aspirator effect on the water line leading to the engine humidifier, thus increasing the degree of suction thereon relative to the suction within the intake duct.

The engine humidifier comprises the body 21 to which is attached a bowl 28 containing a valve 29 controlled by a float 30, the valve 29 controlling the admission of water through an inlet 31 connected by tubing 32 to a supply tank 33 mounted wherever convenient as on the usual instrument board. The float bowl provides a constant level water supply which feeds into a hollow stem 34 which also retains the float bowl in place. The water feed is through a port 35 into a passage 36 in the stem which leads up to a cross passage 37 the opposite ends of which form the outlets 20 previously referred to. A valve seat 38 is inserted in the passage 36 and a needle valve 39 engages therewith to meter the flow of water.

The needle valve 39 is suspended from a diaphragm 40 held over the rim 41 of a bushing 42 by a stamped cover 43 the edges 44 of which are spun under the edge of the rim to clamp the diaphragm in place. The outer periphery of the cover is preferably knurled as indicated at 45 for purposes of adjustment. A spring 46 is interposed in a chamber 47 between the bottom of the bushing and the diaphragm, the spring forcing the diaphragm upwardly, while the bottom of the bushing is apertured so that suction from the tubing 19 acts to pull the diaphragm downwardly to seat the valve. By suitably screwing the bushing in or out in its aperture 48 in the body 21, together with the use of a suitably calibrated spring, the degree of suction required to seat the valve, as well as the amount of opening of the valve, can be varied over wide limits.

As shown in the section of Figure 3 the two outlets 20, the water inlet 31 and a fourth arm 49 are arranged in the form of a cross for convenience, the arm 49 forming a mounting bracket for convenient support of the carbureter by a bolt or cap screw engaging the threaded aperture 50 in said arm.

In operation, the intake suction acts to draw air into the depending arm of the injector body 15 the air passing through the venturi setting up increased suction in the water nozzle and at the same time thoroughly mixing and atomizing the water delivered thereby. The increased suction on the water nozzle is communicated through the tubing 19 to the cross passage 37 and serves to elevate water from the float bowl if the valve 39 is open. At the same time if the suction exceeds a predetermined value it will act on the diaphragm to overcome the spring pressure and thus draw the valve down to its seat to cut off the water supply.

Since the intake suction varies from a maximum at idling to a minimum at full load, the spring is so calibrated as to maintain the valve open below a predetermined degree of suction or sub-atmospheric pressure as for example that corresponding to three quarters load. As the load drops below the desired point the suction increases sufficiently to entirely cut off the flow of water. If the load increases beyond this point the suction decreases correspondingly and permits the spring to increase the valve opening so that more water is supplied as the engine approaches full power. By adjusting the bushing in or out the maximum flow can be regulated.

It will thus be seen that I have invented an improved and simplified engine humidifier with an automatic control responsive to engine load conditions, which control cuts off the flow of water under idling conditions, and which humidifier delivers the water in the form of a mist or atomized water vapor rather than in intermittent slugs of liquid.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In combination, an internal combustion engine including an intake duct for fuel mixture, a venturi through which air may be introduced into said duct at high velocity, a water receptacle, means affording communication between said water receptacle and said venturi to exert sub-atmospheric pressure on the water in said receptacle, and valved means operated by said sub-atmospheric pressure for controlling the flow of water from said receptacle.

2. In combination, an internal combustion engine including an intake duct for fuel mixture, a venturi through which air may be introduced into said duct at high velocity, a water receptacle, means affording communication between said water receptacle and said venturi to exert sub-atmospheric pressure on the water in said receptacle, a pressure responsive valve controlling said communication means, and means yieldingly holding said valve open until a predetermined sub-atmospheric pressure acts thereon through said communication means.

3. In combination, an internal combustion engine including an intake duct for fuel mixture, a venturi through which air may be introduced into said duct at high velocity, a water receptacle, means affording communication between said water receptacle and said venturi to exert sub-atmospheric pressure on the water in said receptacle, a pressure responsive valve controlling said communication means, and means yieldingly holding said valve open until a predetermined sub-atmospheric pressure acts thereon through said communication means, and means for adjusting said yieldingly holding means to vary the sub-atmospheric pressure required to closed said valve.

4. In combination with an internal combustion engine, an intake duct for fuel mixture, a water receptacle, means affording communication between said water receptacle and said intake duct whereby the intake duct sub-atmospheric pressure is exerted on the water in said receptacle, and means in said communication means affected by the sub-atmospheric pressure therein for controlling the flow of water from said receptacle.

5. In combination with an internal combustion engine, an intake duct for fuel mixture, a water receptacle, a duct affording communication between said water receptacle and said intake duct whereby the intake duct sub-atmospheric pressure is exerted on the water in said receptacle, and means affected by said sub-atmospheric pressure for controlling the flow of water from said receptacle, comprising a pressure responsive valve controlling said communication duct, and means yieldingly holding said valve closed until a predetermined sub-atmospheric pressure acts thereon through said communication duct.

In testimony whereof I have hereunto subscribed my name at Kokomo, Howard County, Indiana.

MARK E. ZIMMERER.